United States Patent [19]

Wills et al.

[11] Patent Number: 5,119,451
[45] Date of Patent: Jun. 2, 1992

[54] OPTICAL WAVEGUIDES AS INTERCONNECTS FROM INTEGRATED CIRCUIT TO INTEGRATED CIRCUIT AND PACKAGING METHOD USING SAME

[75] Inventors: Kendall S. Wills, Houston; Paul A. Rodriguez, Lewisville, both of Tex.

[73] Assignee: Texas Instruments Incorporated, Dallas, Tex.

[21] Appl. No.: 636,315

[22] Filed: Dec. 31, 1990

[51] Int. Cl.⁵ .................. G02B 6/12; B32B 31/00; H01J 5/16

[52] U.S. Cl. .................. 385/14; 395/49; 395/89; 395/91; 156/60; 156/158; 156/182; 250/227.11

[58] Field of Search .......... 350/96.11, 96.12, 96.13, 350/96.14, 96.15, 96.17, 96.20, 320; 156/60, 158, 163, 182; 250/227.11

[56] References Cited

U.S. PATENT DOCUMENTS

| | | | |
|---|---|---|---|
| 3,674,914 | 7/1972 | Burr | 350/96.17 X |
| 3,879,606 | 4/1975 | Bean | 350/96.12 |
| 4,065,203 | 12/1977 | Goell et al. | 350/96.20 |
| 4,130,343 | 12/1978 | Miller et al. | 350/96.15 |
| 4,627,687 | 12/1986 | Dorn et al. | 350/96.20 |
| 4,708,429 | 11/1987 | Clark et al. | 350/96.20 |
| 4,756,590 | 7/1988 | Forrest et al. | 350/96.15 |
| 5,009,476 | 4/1991 | Reid et al. | 350/96.11 |
| 5,026,134 | 6/1991 | Sugawara et al. | 350/96.11 |
| 5,035,483 | 7/1991 | Waitl et al. | 350/96.20 |

Primary Examiner—Brian Healy
Attorney, Agent, or Firm—Richard L. Donaldson; William E. Hiller; Ronald O. Neerings

[57] ABSTRACT

Optical waveguides are used to bridge between integrated circuits on different die. The waveguide is suspended on polyamid or some other material. An optional waveguide is built which can have both active components or passive components and beam dumps. The optical waveguides allow the signal from one integrated circuit to another to travel at the speed of light. Such waveguides can be direct deposited to better than 0.2 micron accuracy to connect submicron waveguides on the integrated circuit. The use of conductive waveguides or conductive coatings to encapsulate the waveguide allows electrical signals to be passed along with the optical signal.

23 Claims, 8 Drawing Sheets

OPTICAL WAVEGUIDES AS INTERCONNECTS FROM INTEGRATED CIRCUIT TO INTEGRATED CIRCUIT AND PACKAGING METHOD USING SAME

FIELD OF THE INVENTION

This invention relates to the use of optical waveguides as conductors between integrated circuits and more particularly to device packaging using optical waveguides.

BACKGROUND OF THE INVENTION

Computers and other electronic equipment seem to be smaller and less expensive each year. The semiconductor industry is constantly reducing the size of their product, adding more functions at a lower price in less space to meet the needs of the consumer. Even with all the shrinking which must be performed, the overall performance of computers and other electronic equipment is limited by the capability of the manufacturer to interconnect the integrated circuit devices within the computers and other electronic equipment. Further reduction in the size of the integrated circuit devices and their associated interconnects is limited, particularly by inherent resistance losses.

Electronics manufacturers are putting more die into smaller packages to reduce the size of their products. More die in smaller packages demand wiring that is as short as possible. But even reducing techniques reach a limitation when the speed of a computer or other electronic device has been optimized. The only way to gain performance at this point is to move the information along the wires faster.

A patent application titled, "Device Packaging Using Heat Spreaders And Assisted Deposition Of Wire Bonds" U.S. patent application Ser. No. 07/575,744 by Wills et al., and assigned to Texas Instruments Incorporated, has recently been submitted to the U.S. patent office. In this patent application, metal interconnects are direct deposited onto a substrate to connect an integrated circuit to the outside world. The Wills et al. patent application represents one of several reducing techniques. Others are working on wave guided signals for integrated circuits, but to date, no one has addressed how to connect fine wave guides on an integrated circuit to another circuit. Fiber optics can be used to move data at the speed of light, but fiber optic cables are large, bulky and hard to interconnect to an integrated circuit at specific locations.

What is needed is an interconnect system which can perform at the speed of light and be as small as the integrated circuits which it is connecting.

SUMMARY OF THE INVENTION

In accordance with one embodiment of the invention, a die is placed on a support surface. A filler material is placed between the die and edges of the support surface. The filler may be selected from a group of materials which includes: oxide; poly amide; a combination of layers of oxide and poly amide; or plastic. An optical waveguide, fabricated from oxide, nitrites, or other light transmitting materials, and shaped so that the light is totally internally reflected, extends from a photo emitting or receptor site on the die, across the filler material and beyond the support surface a sufficient distance to be flush with an exterior surface of a later formed device package. Additional waveguides can be connected to additional photo emitting or receptors sites on the same die according to the same method.

In accordance with another embodiment of the invention, a first die and a second die are placed next to each other on a support surface. A filler material, selected from the group of materials mentioned above, is placed between the first and second die. An optical waveguide, fabricated and shaped as discussed above, extends from a photo emitting or receptor site on the first die, across the filler material and to a photo emitting or receptor site on the second die. Additional waveguides can interconnect additional photo emitting or receptors sites on the first and second dies in the same manner.

In accordance with yet another embodiment of the invention, a first die and a second die are placed next to each other on a support surface. A filler material, selected in the above manner, is placed between the first and second die and between the first and second die and the edges of the support surface. A first optical waveguide, fabricated in the above manner, extends from a photo emitting or receptor site on the first die, across the filler material, and beyond the support surface a sufficient distance to be flush with an exterior surface of a later formed device package. A second optical waveguide extends from a photo emitting or receptor site on the first die, across the filler material and to a photo emitting or receptor site on the second die. Additional waveguides can interconnect the first and second die to each other or to the exterior surface of the device package. Many combinations of die can be interconnected in this manner.

If fabricated waveguides are unavailable, impractical or not desired for the particular application, conductive optical medium can be deposited in their place. Indium oxide, tin oxide, and indium tin oxide are examples of the materials which can be deposited. Special materials, including aluminum, titanium, tungsten, chrome and nickel are available and can be deposited under, over and around the waveguide to eliminate possible diffraction problems with the deposited waveguide.

The deposited waveguide can also be used as a passive attenuator by cutting a notch in the waveguide and depositing a second material in the notch with different optical properties.

In some cases the notches might contain electro optical material which can change properties due to an applied electrical field. The extra material does not need to be placed into a notch which is perpendicular to the waveguide. To further enhance the capabilities of the waveguide interconnect, beam dumps can be added which, with a change in the phase of the light will attenuate the beam so it can not propagate down the waveguide.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENT

Figure 1:
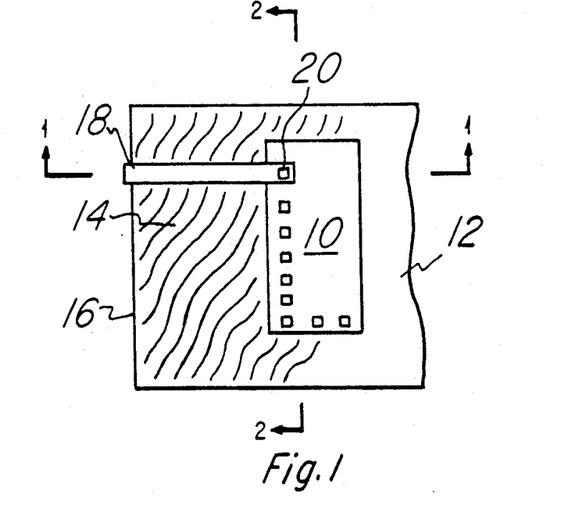
FIG. 1 is a plan view according to the invention.
Figure 2:
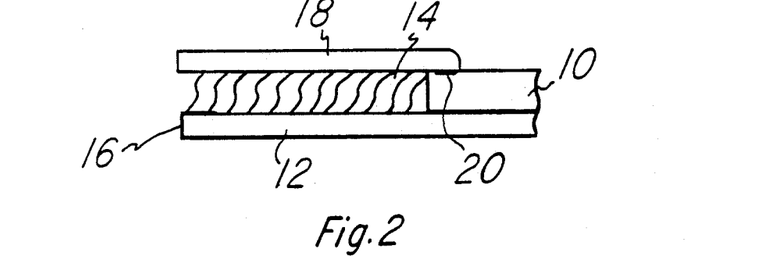
FIG. 2 is an elevational view in section of the device of FIG. 1, taken along the lines 1—1 and 2—2.

In FIGS. 1 and 2, a die 10 is placed on a support surface 12. Filler material 14 is placed between die 10 and the edges 16 of support surface 12. Any method for dispensing filler material 14 that will accomplish the job may be used. Some of the more common methods include silk screening, CVD deposition of material, spraying or injection. The filler material is used to support optical waveguides and any deposited leads.

Figure 3:
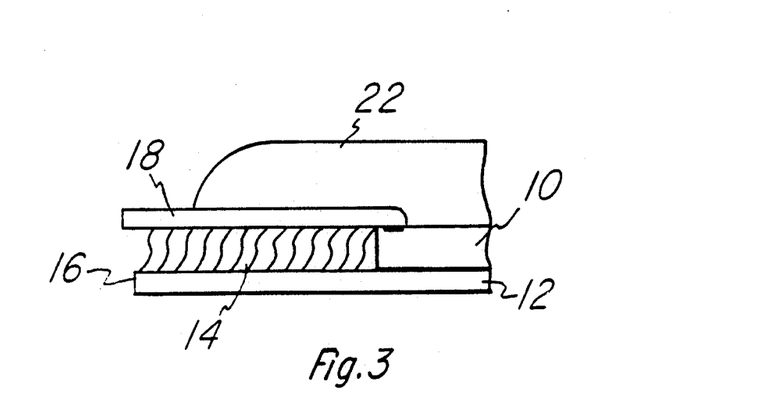
FIG. 3 is an elevational view in section of the device of FIG. 1, taken along the lines 1—1 and 2—2 according to another embodiment of the invention.
Figure 4:
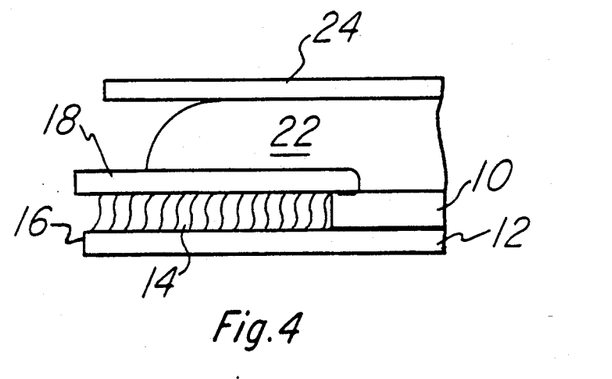
FIG. 4 is an elevational view in section of the device of FIG. 1, taken along the lines 1—1 and 2—2 according to yet another embodiment of the invention.

An optical waveguide 18, fabricated from oxide, nitrites, or other light transmitting materials, and shaped so that the light is totally internally reflected, extends from a photo emitting site or receptor 20 on die 10, across filler 14 and beyond support surface 12 a sufficient distance to be flush with an exterior surface of the device package which will be formed later. The connection of optical waveguide 18 to die 10 must maintain critical angle for total internal reflection. If a corner is used to connect optical waveguide 18 to die 10, the corner must also be shaped so that the light is totally internally reflected. A protective coating 22 can be deposited on die 10, as shown in FIG. 3. Examples of such protective coatings include: PIX, PIQ, silicon heat transfer grease, nitride, oxide, etc. Since the surface of die 10 is flat, relatively speaking, a protective surface 24 can be placed on top of die 10. If no protective surface 24 is wanted on top of die 10, the PIQ or PIX will act to prevent the plastic package from tearing the optical waveguide from photo emitting site or receptor 20 on die 10.

Figure 5:
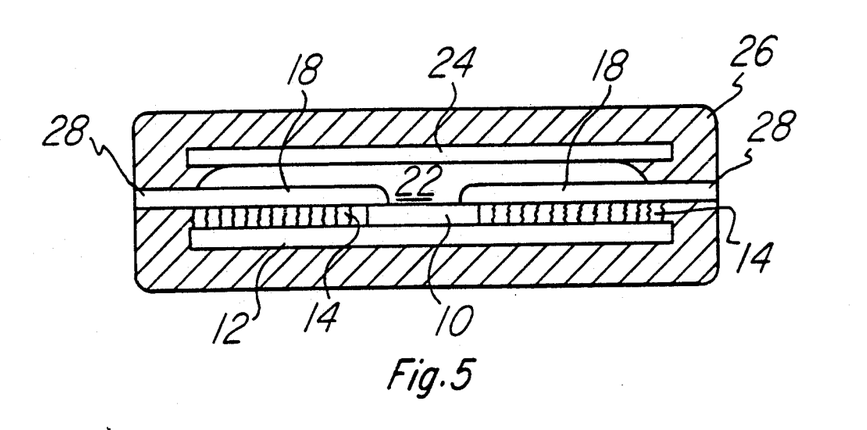
FIG. 5 is an elevational view in section of the device of FIG. 1, taken along the line 1—1 according to the preferred embodiment of the invention.

It is to be understood that there can be additional waveguides connected to additional photo emitting sites or receptors on die 10 according to the same method. After all connections are completed, the device is encapsulated in a package 26, as shown in FIG. 5. CVD deposition can be used to coat the outside of package 26 with a nitride coating or an oxide to prevent the package from taking in moisture. Additionally, the surface 28 of optical waveguide 16, which extends through package 26, must be polished for connection to another device external to package 26. Light enters and exits the package through surface 28.

Figure 6:
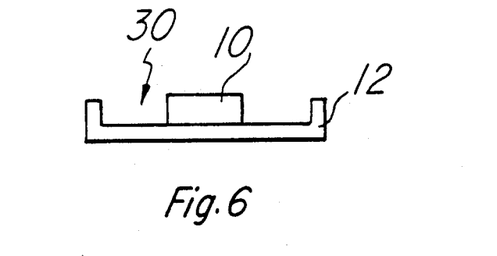
FIG. 6 is an elevational view in section of another embodiment of the invention.
Figure 7:
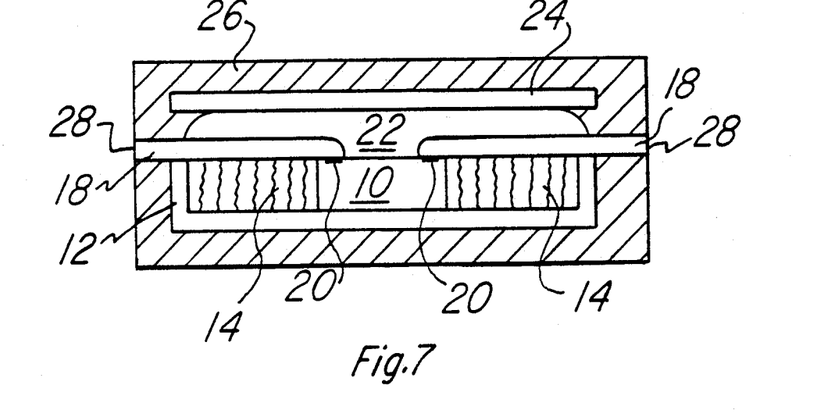
FIG. 7 is an elevational view in section of the device of FIG. 1, taken along the lines 1—1 and 2—2 according to yet still another embodiment of the invention.

In another embodiment of the invention, shown in FIG. 6, support surface 12 has a recessed area 30 for die 10. Filler material 14 is placed in the void between die 10 and recessed area 30 to support the waveguides 18, as shown in FIG. 7. Optical waveguides 18 are connected, and the device is encapsulated in a package 26, in the manner previously discussed.

Figure 8:
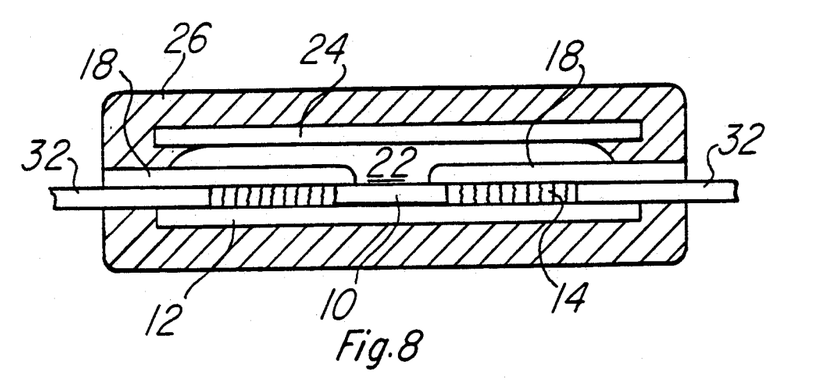
FIG. 8 is an elevational view in section of the device of FIG. 1, taken along the lines 1—1 and 2—2 according to yet a further embodiment of the invention.

In yet another embodiment of the invention, shown in FIG. 8, support surface 12 is a heat spreader having a lead frame 32 positioned around die 10 on support surface 12. Filler material 14 is placed between die 10 and lead frame 32 to support the waveguides and any deposited leads.

Many other support surface types, sizes, shapes and combinations with other surfaces are possible. The only mandatory requirement is that the optical waveguides must be supported from the photo emitting or receptor sites on the die to the outside surface of the device package.

Figure 9:
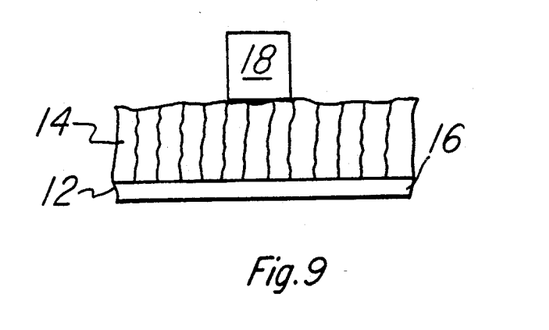
FIG. 9 is a detail view of FIG. 1, taken along the line 3—3, of another embodiment of the invention.

As an alternative to the fabricated optical wave guide, a conductive optical medium can be deposited, as shown in FIG. 9. Indium oxide, tin oxide, and indium tin oxide are examples of materials which can be deposited. The deposition technique is not important, but vacuum deposition such as a sputter system or some form of direct write laser deposition can be used. Problems arise when the directly deposited material contacts a surface capable of diffracting the light or causing the material to work as an optical wave guide. To overcome this problem, special materials can be deposited under, over and around the waveguide. Suitable materials include aluminum, titanium, tungsten, chrome or nickel. Conductive materials used as the waveguide or the cladding for the wave guide will allow electrical signals to be applied to the integrated circuit.

Figure 10:
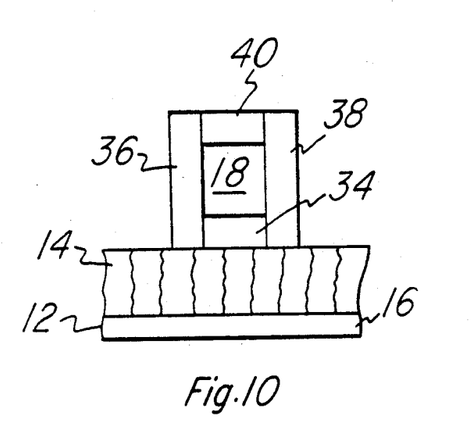
FIG. 10 is a detail view of FIG. 1, taken along the line 3—3, of yet another embodiment of the invention.
Figure 11:
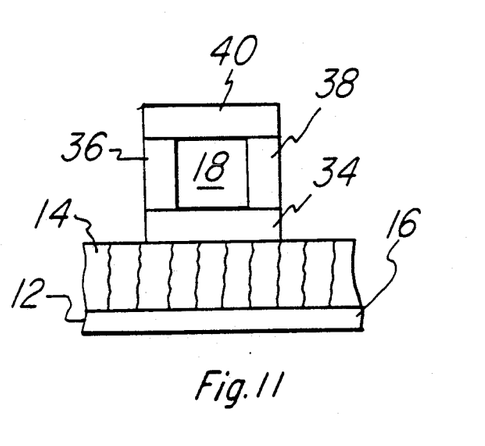
FIG. 11 is a detail view of FIG. 1, taken along the line 3—3, of still yet another embodiment of the invention.
Figure 19:
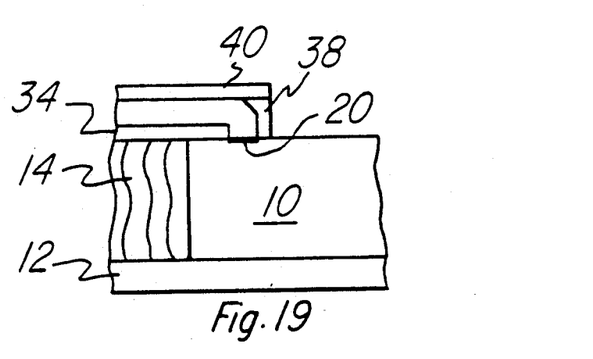
FIG. 19 is a detail view of FIG. 2 using a deposited waveguide.

FIGS. 10 and 11 show special materials 34, 36, 38 and 40 which are deposited under, around, around and over wave guide 18, respectively. As an example, special materials 34, 36, 38 and 40 may all be aluminum. In another example, special materials 34, 36, 38 and 40 are selected from Ti, w, w and Al respectively. Conductive materials used as the waveguide or the cladding for the waveguide may allow electrical signals to be applied to the integrated circuit. Any corners formed in the conductive material must be shaped so that the light is totally internally reflected. The corners may be shaped by resist patterning, resist etch back or low beam milling. FIG. 19 shows a corner connection of waveguide 18 to photo emitting or receptor site 20 on die 10.

The special materials 34, 36, 38 and 40, if opaque to the wavelength of light emitted from the transmitter, must not cover the transmitter or receiver but must stop short allowing the waveguide the ability to connect the light to and from the transmitter or receiver.

As an alternative to special materials 34, 36, 38 and 40 surrounding a deposited waveguide 18, special materials 34, 36, 38 and 40 may surround a void to form an ambient waveguide.

Figure 12:
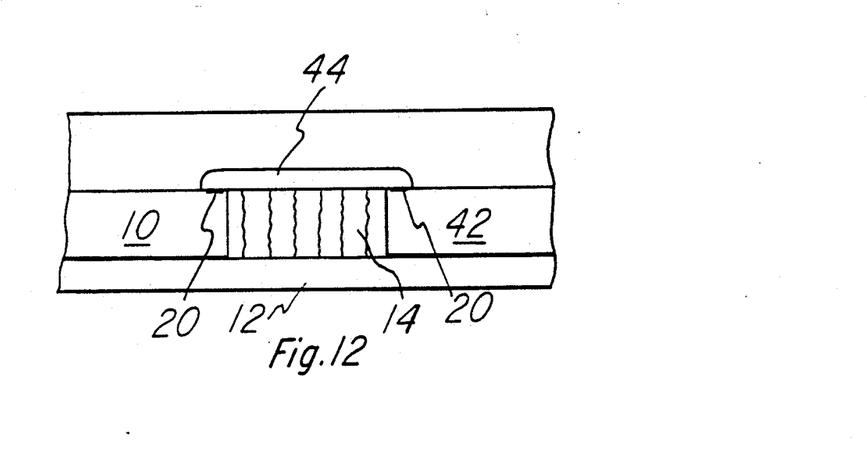
FIG. 12 is an elevational view of another embodiment of the invention.

In still yet another embodiment of the invention, as shown in FIG. 12, a second die 42 is placed adjacent to die 10. Filler material 14 is placed between die 10 and 42. Optical waveguide 44, either fabricated or directly deposited, extends from a receptor/transmitter 20 of die 10 over filler material 14 to a receptor/transmitter 20 of die 42.

Figure 13:
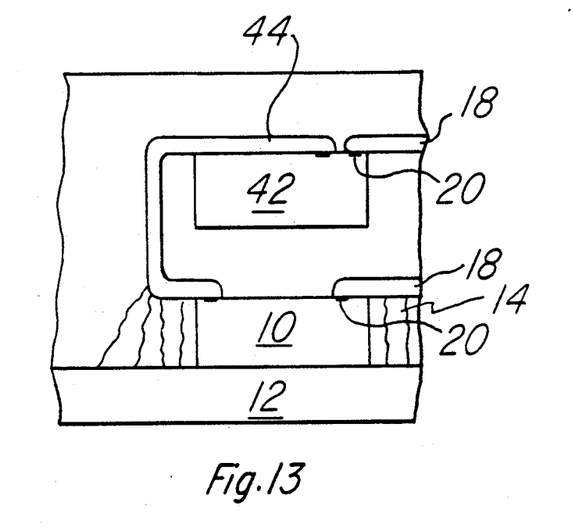
FIG. 13 is an elevational view of yet another embodiment of the invention.
Figure 14:
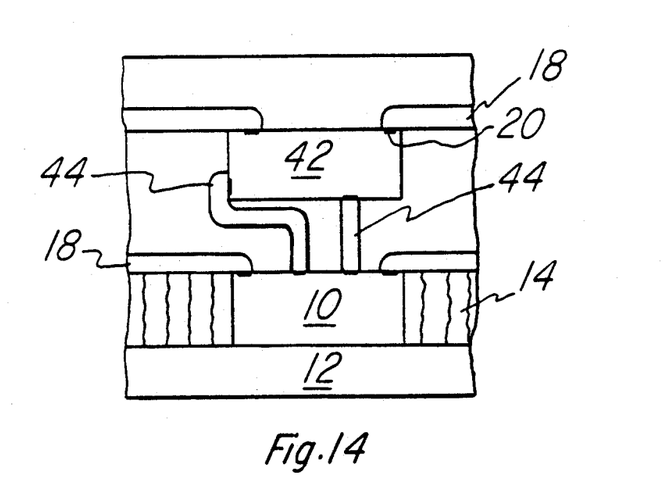
FIG. 14 is an elevational view of still yet another embodiment of the invention.

In still other embodiments of the invention, as shown in FIGS. 13 and 14, second die 42 is placed above die 10. FIGS. 13 and 14 show two examples of connecting optical waveguide 44 from a receptor/transmitter 20 of die 10 to a receptor/transmitter 20 of die 42. It is to be understood that dies 10 and 42 may be interconnected with optical waveguides 44 with or without optical waveguides 18 that extend to the surface of the device package.

Figure 15:
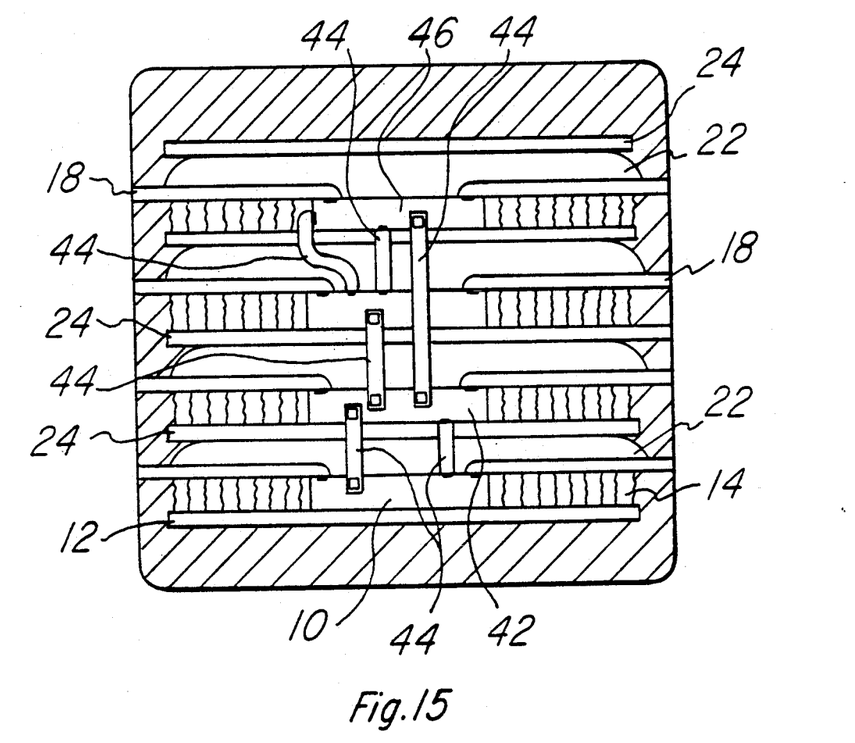
FIG. 15 is an elevational view of yet a further embodiment of the invention.

In FIG. 15, multiple die 42, 44, 46 and 48 are interconnected to each other with multiple optical waveguides 44 and to the surface of device package with optical waveguides 18. The number of die that may be interconnected is limited only by the available technology.

Figure 16:
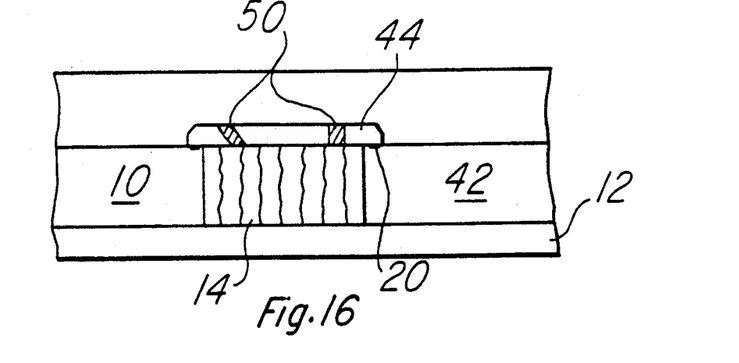
FIG. 16 is an elevational view of still yet a further embodiment of the invention.

Special situations might arise in which a waveguide might need to act as a passive attenuator. In such a case, materials can be placed into the waveguide by cutting a notch 50 in the waveguide and depositing a second material with different optical properties, as shown in FIG. 16. A typical example would be a silicon dioxide waveguide cut to add an indium tin oxide. In some cases the notches might contain electro optical material which can change properties due to an applied electrical field. The extra material does not need to be placed into a notch which is perpendicular to the waveguide. In fact, an angular cut would be more typical.

Figure 17:
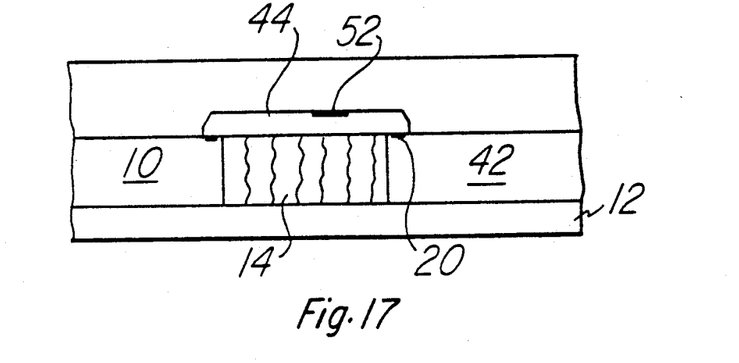
FIG. 17 is an elevational view of still yet another embodiment of the invention.
Figure 18:
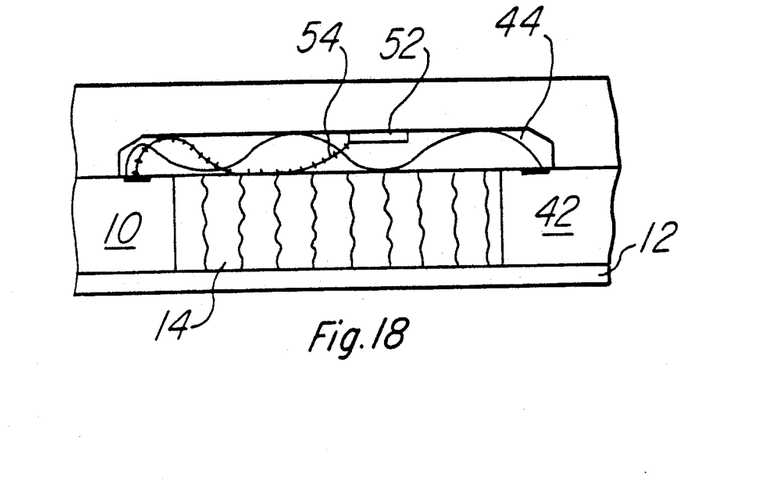
FIG. 18 is an elevational view, greatly enhanced, of the device of FIG. 17 with the addition of a signal path.

To further enhance the capabilities of the waveguide interconnect, beam dumps 52, shown in FIG. 17, can be added which, with a change in phase of the light will attenuate the beam 54 so it can not propagate down the waveguide, as shown in FIG. 18.

If the interconnects are direct deposited, they can be connected to another die with an accuracy today of 0.2 micron to a size of less than a micron.

What is claimed:

1. A packaged device, comprising:
   a support surface having edges;
   a semiconductor die positioned on said support surface, said semiconductor die having at least one photo emitting or reception site;
   a filler material between said die and said edges of said support surface; and
   an optical waveguide, said optical waveguide extending from said photo emitting or reception site, across said filler material and beyond said support surface.

2. A device according to claim 1 including additional optical waveguides and additional photo emitting or reception sites, each additional optical waveguide extending from an additional photo emitting or reception site, across said filler material and beyond said support surface.

3. A device according to claim 2 including a second semiconductor die positioned above said die, said second die having at least one photo emitting or reception site and an optical waveguide interconnecting said photo emitting or reception site of said die to said photo emitting or reception site of said second die.

4. A device according to claim 1 wherein said optical waveguide is fabricated from oxides, nitrites or other light transmitting materials.

5. A device according to claim 1 wherein said optical waveguide is deposited material, examples of which include indium oxide, tin oxide and indium tin oxide.

6. A device according to claim 5 including materials deposited under, over and around the waveguide.

7. A device according to claim 6 wherein said materials include aluminum, titanium, tungsten, chrome and nickel.

8. A device according to claim 4 including cutting a notch in said waveguide and depositing a second material with different optical properties in said notch.

9. A device according to claim 4 including cutting a notch in said waveguide and depositing electro optical material which can change properties due to an applied electrical field.

10. A device according to claim 4 including beam dumps in said waveguide.

11. A packaged device, comprising:
    a support surface having edges;
    a first semiconductor die and a second semiconductor die positioned on said support surface, each semiconductor die having at least one photo emitting or reception site;
    a filler material between said first die and said second die; and
    an optical waveguide, said optical waveguide extending from said photo emitting or reception site on said first die, across said filler material and to said photo emitting or reception site on said second die.

12. A device according to claim 11 including additional optical waveguides and additional photo emitting or reception sites, each additional optical waveguide extending from an additional photo emitting or reception site, across said filler material and to an additional photo emitting or reception site on said second die.

13. A device according to claim 11 including at least one additional semiconductor die above said first and second semiconductor dies and additional optical waveguides interconnecting said at least one additional semiconductor die with said first and second semiconductor dies.

14. A packaged device, comprising:
    a support surface having edges;
    a first semiconductor die and a second semiconductor die positioned on said support surface, each semiconductor die having at least two photo emitting or reception sites;
    a filler material between said first die and said second die and between said first and second die and said edges of said support surface;
    a first optical waveguide extending from one of said two photo emitting or reception sites on said first die, across said filler material and beyond said support surface;
    a second optical waveguide extending from the other of said two photo emitting or reception sites on said first die, across said filler material and to one of said two photo emitting or reception sites on said second die.

15. A device according to claim 14 including additional optical waveguides and additional photo emitting or reception sites on said first and second semiconductor dies, each additional optical waveguide extending from an additional photo emitting or reception site on said first die, across said filler material and to an additional photo emitting or reception site on said second die.

16. A device according to claim 15 including additional optical waveguides and additional photo emitting or reception sites on said first semiconductor die, each additional optical waveguide extending from said additional photo emitting or reception site on said first die, across said filler material and beyond said support surface.

17. A device according to claim 16 including additional optical waveguides and additional photo emitting or reception sites on said second semiconductor die, each additional optical waveguide extending from said additional photo emitting or reception site on said second die, across said filler material and beyond said support surface.

18. A device according to claim 15 including at least one additional semiconductor die above said first and second semiconductor dies and additional optical waveguides interconnecting said at least one additional semiconductor die with said first and second dies.

19. A method of packaging a device, comprising the steps of:
   placing a die on a support surface;
   inserting a filler material between said die and edges of said support surface; and
   connecting an optical waveguide on said die from a photo emitting or reception site on said die, across said filler material and beyond said edge of said support surface.

20. A method according to claim 19 including the steps of:
   placing a second die on said support surface;
   inserting a filler material between said die and said second die; and
   connecting an optical waveguide between said die and said second die.

21. A method according to claim 19 including the steps of:
   placing at least one additional die above said die;
   inserting a filler material between said die and said additional die; and
   interconnecting said photo emitting or reception site of said die with said photo emitting or reception site of said additional die with an optical waveguide.

22. A device according to claim 1 wherein said optical waveguide includes electrically conductive materials which allow the conduction of electrical signals to the semiconductor die.

23. A device according to claim 1 wherein said optical waveguide includes an electrically conductive cladding to allow the conduction of electrical signals to the semiconductor die.

* * * * *